June 13, 1961

R. A. JEWELL 2,988,373

LIQUID SPRING SUSPENSION FOR VEHICLES

Filed June 12, 1958

INVENTOR
Robert A. Jewell

BY Mason, Fenwick & Lawrence
ATTORNEYS

United States Patent Office 2,988,373
Patented June 13, 1961

2,988,373
LIQUID SPRING SUSPENSION FOR VEHICLES
Robert A. Jewell, Savannah, Ga., assignor to Great Dane Trailers Inc., Savannah, Ga., a corporation of Georgia
Filed June 12, 1958, Ser. No. 741,656
3 Claims. (Cl. 280—104.5)

This invention relates to springs, and particularly to compression springs wherein liquid is used as the compressible medium.

The general object of the present invention is to provide a spring employing a liquid, such as silicone which has some compressibility, as the yieldable material, which spring can be adapted to use on vehicles.

A more specific object is to provide such a spring wherein the cushioning strength will increase as the load increases to supply an automatically variable rate liquid springing member.

A still more specific object is the provision of means in a liquid spring for progressively increasing displacement rate in accordance with load increases, by increasing the size of the displacement member.

Another object is to provide a vehicle tandem axle spring suspension utilizing liquid for the compressible medium, with means to permit volumetric adjustment between springing means to compensate for differential axle movement.

A further object is the provision of a tandem spring suspension with means to separate the spring units for independent operation, or connect them for compensating action.

Yet another object of the invention is to provide a liquid spring system having means to vary the effective liquid volume to increase or decrease the total compressibility of the liquid to adjust the spring rate.

Other objects of the invention will become apparent from the following description of one practical embodiment thereof when taken in conjunction with the drawings which accompany, and form part of, this specification.

In general, the liquid spring of the present invention consists of a liquid chamber with a piston having several sleeves of increasing diameters movable successively into the chamber as the load is increased to compress the liquid. The invention also contemplates a pair of such units mounted on tandem axles and interconnected by a liquid conduit to permit interposition of the load on one spring or upon the other. In addition one or more auxiliary liquid-filled chambers may be provided to be opened to increase the liquid volume upon which the load is imposed to vary the spring rate.

Figure 1:
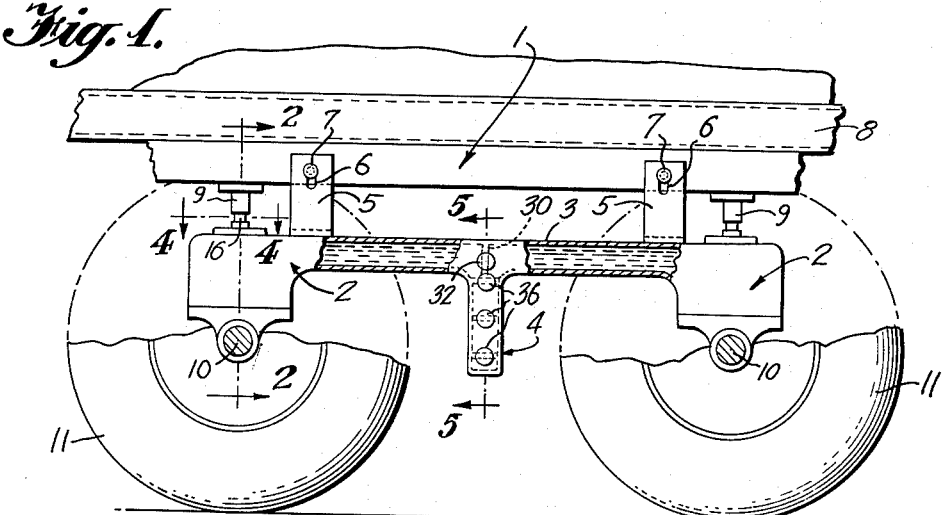
FIGURE 1 is a side elevation of a tandem axle spring suspension embodying the principles of the present invention, parts being broken away to illustrate interior channels.
Figure 2:
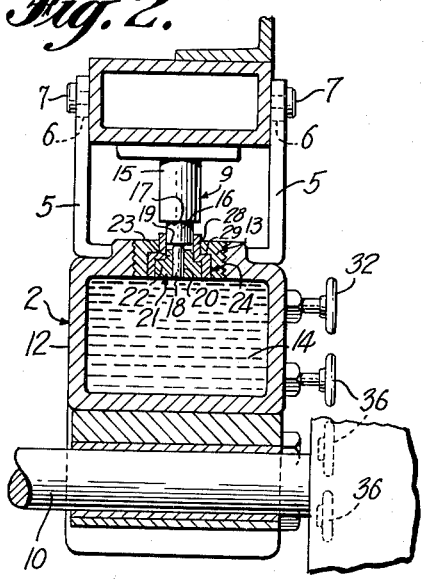
FIGURE 2 is a vertical section through one of the spring units, taken substantially on the line 2—2 of FIGURE 1 and showing the parts in unloaded position.
Figure 3:
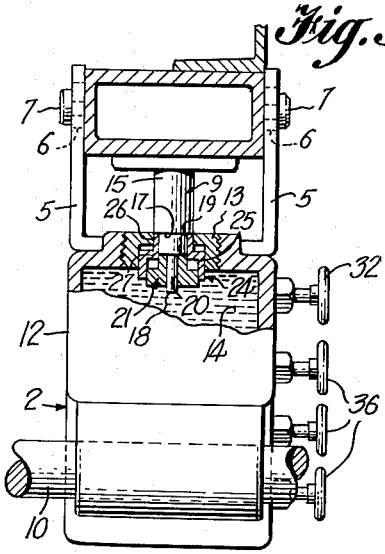
FIGURE 3 is a view similar to FIGURE 2, showing the parts in fully loaded position.
Figure 4:
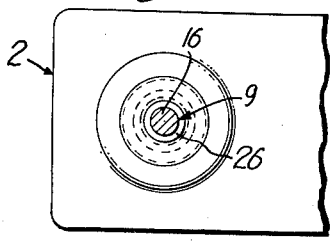
FIGURE 4 is a horizontal section taken on the line 4—4 of FIGURE 1, showing the spring unit in top plan.
Figure 5:
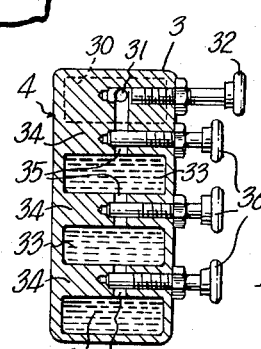
FIGURE 5 is a vertical section taken on the line 5—5 of FIGURE 1.

Referring to the drawings in detail, there is shown somewhat diagrammatically in FIGURE 1 a tandem axle spring mount 1, which includes two liquid springs 2 at opposite ends of a liquid conduit 3. Auxiliary reservoirs 4 depend from the conduit. Brackets 5, having slots 6 through which bolts 7 pass, may be used to connect the spring assembly to a vehicle frame 8. The bolt and slot arrangement will permit relative movement between the spring assembly and the vehicle frame. The weight of the vehicle will be imposed by means of pistons 9 upon the liquid of the springs 2. The springs themselves may be connected to the vehicle axles 10 which support the wheels 11. It will be understood that the above described means for connecting the springs to the vehicle is merely illustrative. The precise mounting arrangement is unimportant to the present invention so long as the pistons 9 take the vehicle load and impose it upon the springs and there can be relative movement between the spring chamber and the vehicle frame.

The springs 2 are identical, and it will be obvious that each could be used as a separate unit. Each comprises a housing 12 which is closed by a threaded cap 13 and forms a chamber to receive liquid 14. The chamber will be filled with a liquid having some compressibility such as silicone. The liquid is compressed by movement of the piston 9 into the chamber to displace given quantities of the liquid under predetermined loads.

The piston, as shown, comprises a rod, or stem, 15 to be connected to the load to be supported. Near the lower end, the piston is reduced in diameter to form a plunger 16, with annular shoulder 17 formed between the main stem and the plunger. The lowermost end is further reduced to provide a displacement member 18, with an annular shoulder 19 at the juncture of the displacement member and the plunger.

The displacement member 18 of the piston is slidable in an opening 20 through a sleeve, or second displacement member 21. The sleeve is shorter than the displacement member 18 so that the piston may have some downward movement before the shoulder 19 contacts the top of the sleeve to move the sleeve with the piston. This permits the piston to move downwardly under initial load moving only the displacement member 18 into the liquid chamber to displace and compress the liquid. As the load increases the piston will be depressed farther, causing shoulder 19 to contact the top of sleeve 21, to move the sleeve into the liquid chamber. This greatly increases the diameter, and consequently the cubic content, of the displacement unit, to increase the spring rate to support the additional load. Sleeve 21 is formed as body 22 of prescribed diameter having an upstanding collar 23 of reduced diameter. This allows a second sleeve 24 to be fitted over the first, to slide upon the collar 23 and seat upon the top of the body 22 of the sleeve 21. Sleeve 24 will have a cylindrical body member 25 to fit closely around the body of sleeve 21, an upstanding collar 26 to fit slidably upon the plunger section 16 of the piston and an annular web 27, connecting the body and collar and adapted to rest upon the body of the sleeve 21 when the sleeves are nested. The closure plug or cap 13 for the housing will have a central aperture 28 to slidably receive the collar 26 of sleeve 24, and be recessed on its underside as at 29, to snugly seat the body of sleeve 24. The collar of sleeve 24 is adapted to be contacted by shoulder 17 on the piston to cause the sleeve to move downwardly with the piston. It will be noted the length of the displacement member 18 and the plunger 16 are so chosen that the displacement member 18 will move a predetermined distance downwardly before shoulder 19 contacts the top of collar 23 of sleeve 21, and sleeve 21 will move downwardly before shoulder 17 contacts the sleeve 24 to start its movement. Thus, the three displacement members 18, 21 and 24 will be put into operation in planned succession. Preferably, the bottom surfaces of the member 18, the sleeves 21 and 24, and the housing plug 13 will lie in a single plane when the liquid chamber is filled and there is no load upon the piston.

As mentioned previously, the chambers may be interconnected by conduit 3 for tandem suspension, and the loading on one spring will be compensated by the other by the transfer of pressure from one to the other through the liquid column in conduit 3. In order to divide the springs for independent operation, conduit 3 is divided at its center by means of a partition 30. The partition is provided with an aperture 31 controlled by a suitable valve, such as the gate valve 32. When the valve is opened, the pressures in the two spring housings will equalize, and when the valve is closed the spring will operate independently.

The auxiliary reservoir structure 4 includes a plurality of chambers 33 in alignment. Each chamber is separated from the next, or in the case of the top chamber from the conduit 3, by a partition 34. Each partition 34 has a central aperture 35 controlled by a valve 36. By opening the uppermost valve, the liquid in the top chamber 33 is added to the liquid already in the system, thus increasing the amount of displacement possible by the piston in the chamber for a given load and softening the action of the spring. Opening additional auxiliary chambers will further vary the spring rate.

It is believed that the operation of the device has been sufficiently described along with the structure so that no further description is necessary.

While in the above one practical embodiment of the invention has been disclosed, it will be understood that the precise details of construction shown and described are merely for purposes of illustration and the invention may take other forms within the scope of the appended claims.

What is claimed is:

1. A liquid spring suspension for vehicles comprising, a pair of housings, a conduit rigidly interconnecting said housings and having its ends communicating with the interiors of said housings, whereby the interior of said housings and conduit form a common chamber for receiving a compressible liquid, means for connecting a vehicle axle to each of said housings to provide a tandem wheel mount in which the interconnected housings form a connecting link between the axles, liquid displacing pistons mounted for movement into said housings under load, and means for connecting the pistons to a load bearing member of a vehicle.

2. A liquid spring suspension for vehicles as claimed in claim 1 wherein there is an auxiliary liquid chamber opening into the common chamber, and means for selectively establishing and closing off communication between the auxiliary and common chambers to vary the volume of the body of liquid acted upon by the pistons.

3. A liquid spring comprising, a housing defining a compressible liquid-receiving chamber, a liquid displacing piston movable into said chamber under load to compress liquid in the chamber, an auxiliary liquid-receiving chamber having communication with the first chamber, means to close off communication between said chambers, whereby the volume of the body of liquid acted upon by movement to the piston can be varied, a plurality of additional chambers, serially connected to the second-mentioned chamber and to each other, each of said additional chambers having communication with adjacent chambers, and means to close off communication between said additional chambers.

References Cited in the file of this patent

UNITED STATES PATENTS

| 1,066,712 | Cooper | July 8, 1913 |
| 1,505,036 | Lanchester | Aug. 12, 1924 |
| 1,835,112 | Hawkins | Dec. 8, 1931 |
| 1,940,914 | Marcum | Dec. 26, 1933 |
| 2,042,596 | Gouirand | June 2, 1936 |
| 2,139,178 | Stevens | Dec. 6, 1938 |
| 2,707,110 | Stover | Apr. 26, 1955 |
| 2,740,625 | Taylor | Apr. 3, 1956 |
| 2,812,954 | Lyon | Nov. 12, 1957 |
| 2,949,315 | Taylor | Aug. 16, 1960 |